United States Patent
Jung et al.

(10) Patent No.: US 9,926,635 B2
(45) Date of Patent: Mar. 27, 2018

(54) IRRIGATION SYSTEM

(71) Applicant: YUAN ZE UNIVERSITY, Taoyuan (TW)

(72) Inventors: Guo-Bin Jung, Taoyuan County (TW); Chia-Chen Yeh, Miaoli County (TW); Jyun-Wei Yu, Taoyuan (TW); Chia-Ching Ma, Taoyuan (TW); Chung-Wei Hsieh, Tainan (TW); Cheng-Lung Lin, Taichung (TW)

(73) Assignee: YUAN ZE UNIVERSITY, Taoyuan (TW)

( * ) Notice: Subject to any disclaimer, the term of this patent is extended or adjusted under 35 U.S.C. 154(b) by 98 days.

(21) Appl. No.: 15/253,240

(22) Filed: Aug. 31, 2016

(65) Prior Publication Data

US 2017/0362722 A1    Dec. 21, 2017

(30) Foreign Application Priority Data

Jun. 17, 2016  (TW) .............................. 105119116 A

(51) Int. Cl.

| | |
|---|---|
| *C25B 1/04* | (2006.01) |
| *B01F 3/04* | (2006.01) |
| *C25B 15/02* | (2006.01) |
| *C25B 1/10* | (2006.01) |
| *C25B 9/10* | (2006.01) |
| *C25B 15/08* | (2006.01) |
| *C02F 1/467* | (2006.01) |
| *A01G 25/00* | (2006.01) |

(52) U.S. Cl.
CPC .............. *C25B 15/02* (2013.01); *A01G 25/00* (2013.01); *B01F 3/04* (2013.01); *C02F 1/4672* (2013.01); *C25B 1/04* (2013.01); *C25B 1/10* (2013.01); *C25B 9/10* (2013.01); *C25B 15/08* (2013.01); *C02F 2201/46115* (2013.01); *C02F 2201/46135* (2013.01)

(58) Field of Classification Search
CPC ..... C25B 1/04; C25B 1/02; C25B 1/00; B01F 3/04
USPC ....................... 204/278; 261/26, 30
See application file for complete search history.

(56) References Cited

U.S. PATENT DOCUMENTS 7,396,441 B2 * 7/2008 Senkiw .................. A01G 31/00
                                                204/232
9,255,333 B2 * 2/2016 Ouwerkerk ............... C25B 1/12

* cited by examiner

*Primary Examiner* — Robert A Hopkins
(74) *Attorney, Agent, or Firm* — Li & Cai Intellectual Property (USA) Office

(57) ABSTRACT

An irrigation system is provided. The irrigation system includes a reservoir for storing irrigation water, an electrolytic gas generator, a detector, and a control unit. The electrolytic gas generator is in fluid communication with the reservoir to output a first gas and a second gas generated by the electrolytic gas generator to the irrigation water. The detector is arranged in the water reservoir to detect the concentrations of dissolved first gas and dissolved second gas of the irrigation water to obtain dissolved gas concentration information. The control unit electrically connects to the detector and the electrolytic gas generator receives the dissolved gas concentration information and adjusts the voltage applied to the electrolytic gas generator according to the dissolved gas concentration information to control the type of gas generated by the electrolytic gas generator and the concentrations of dissolved first and second gas of the irrigation water.

12 Claims, 3 Drawing Sheets

IRRIGATION SYSTEM

BACKGROUND

1. Technical Field

The present disclosure relates to an irrigation system, in particular, to an irrigation system employing a proton exchange membrane (PEM) electrolyzer for processing irrigation water.

2. Description of Related Art

In the agriculture, pesticides are often used to reduce diseases of the plants to ensure good yield of the agricultural product. In addition, after the agricultural products are harvested, chemicals are often used to spray the vegetables and the fruits to keep the freshness of these products.

However, pesticides and chemicals can be harmful to the human body if they remain on the vegetables or fruits. In addition, the use of pesticides and chemicals leads to environment pollution. Therefore, advanced countries have strictly specified the timing and amount of the use of pesticides during the plantation of the agricultural product, thereby insuring that the amount of the pesticides remaining on the agricultural product is less than the maximum allowed national standard.

With the rise of awareness in environmental protection and a healthy lifestyle, people are willing to spend more money for organic vegetables or fruits to maintain their health. People spend more effort to maintain the plantation environment not using pesticides. However, since the plantation process requires a large amount of manpower and effort, the production cost is high and the price of organic plants are high. Therefore, one of the objects in the agricultural business is to reduce the cost of the plantation, and to reduce the use of pesticides to provide healthy and relatively cheap vegetables and fruits for the consumers.

SUMMARY

In view of the above objective, the instant disclosure provides an irrigation system which employs the gases generated by the electrolysis of water carried out by a proton exchange membrane (PEM), such as hydrogen gas, oxygen gas and ozone. The above gases are dissolved in the water and the water is sprayed on the agriculture plants for preventing pests and plant disease, thereby reducing the use of pesticides and chemicals.

An embodiment of the instant disclosure provides an irrigation system, comprising a reservoir, an electrolytic gas generator, a detector and a control unit. The electrolytic gas generator can generate a first gas and a second gas. The reservoir stores irrigation water and is in fluid communication with the electrolytic gas generator for mixing the first gas and the second gas with the irrigation water. The detector is arranged in the reservoir for detecting the irrigation water for obtaining a concentration detection information, in which the concentration detection information comprises a concentration of dissolved first gas and a concentration of dissolved second gas. The control unit is electrically connected to the electrolytic gas generator and the detector, in which the control unit adjusts a voltage value of the electrolytic gas generator according to the concentration detection information, and the control unit controls the type of the gases generated by the electrolytic gas generator and adjusts the concentration of dissolved first gas and the concentration of dissolved second gas in the irrigation water by adjusting the voltage value.

To sum up, in the irrigation system provided by the instant disclosure, the electrolysis of water can generate hydrogen gas, oxygen gas and ozone. Dissolving the above gases into irrigation water can improve the planting environment. In addition, the control unit adjusts the voltage value of the electrolytic gas generator according to the concentration of dissolved gases, thereby enhancing the benefit of the irrigation water with the gases toward the growth of the agricultural products and preventing the diseases thereof.

In order to further understand the techniques, means and effects of the instant disclosure, the following detailed descriptions and appended drawings are hereby referred to, such that, and through which, the purposes, features and aspects of the instant disclosure can be thoroughly and concretely appreciated; however, the appended drawings are merely provided for reference and illustration, without any intention to be used for limiting the instant disclosure.

BRIEF DESCRIPTION OF THE DRAWINGS

The accompanying drawings are included to provide a further understanding of the instant disclosure, and are incorporated in and constitute a part of this specification. The drawings illustrate exemplary embodiments of the instant disclosure and, together with the description, serve to explain the principles of the instant disclosure.

DESCRIPTION OF THE EXEMPLARY EMBODIMENTS

Figure 1:
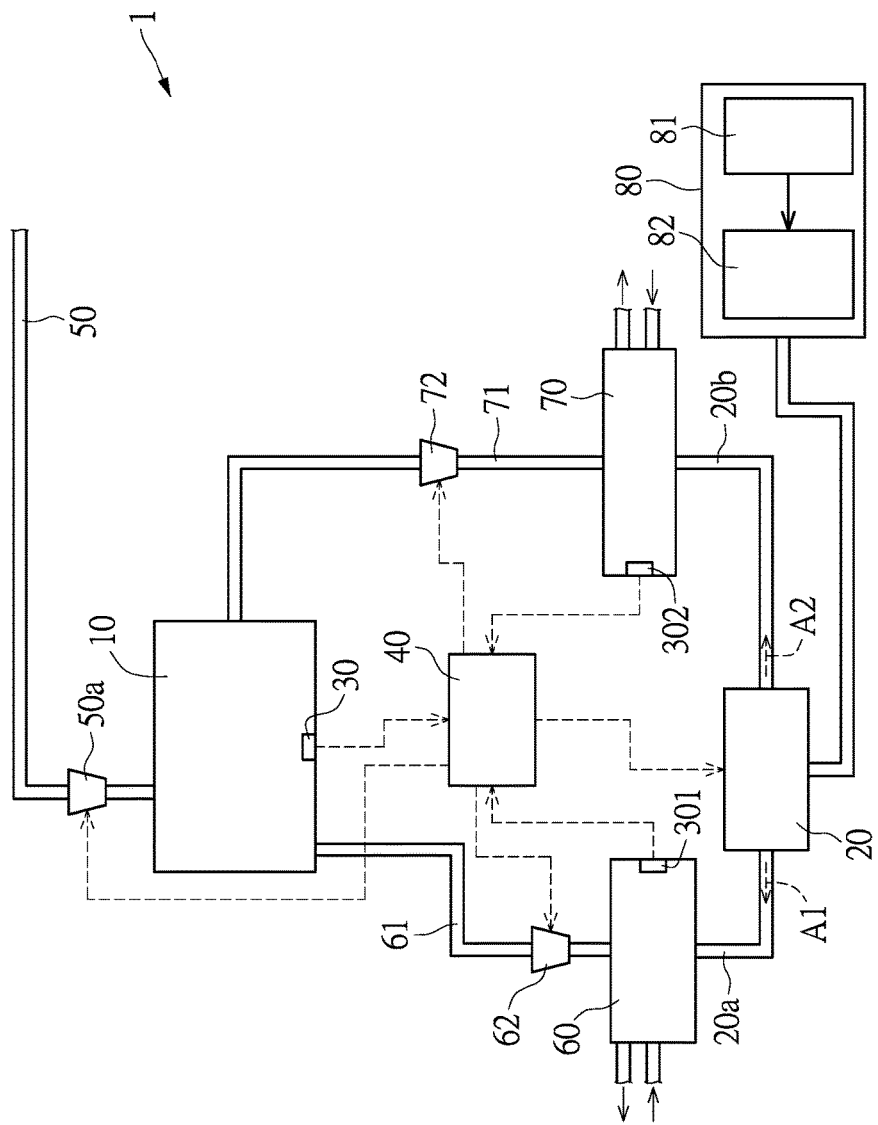
FIG. 1 shows a block diagram of the irrigation system provided by the embodiments of the instant disclosure.

Reference will now be made in detail to the exemplary embodiments of the instant disclosure, examples of which are illustrated in the accompanying drawings. Wherever possible, the same reference numbers are used in the drawings and the description to refer to the same or like parts.

FIG. 1 shows a block diagram of the irrigation system provided by the embodiments of the instant disclosure. The irrigation system 1 of the embodiments of the instant disclosure can provide irrigation water having different concentrations of dissolved gases according to different needs.

Specifically, the irrigation system 1 comprises a reservoir 10, an electrolytic gas generator 20, a detector 30 and a control unit 40.

The reservoir 10 stores irrigation water. In the embodiments of the instant disclosure, the irrigation system 1 further comprises an output end 50 communicated with the reservoir 10, and an output control valve 50a arranged between the output end 50 and the reservoir 10. The irrigation water in the reservoir 10 flows out from the output end 50 and the output control valve 50a controls the amount of the irrigation water passing the output end 50. In an embodiment, the output end 50 is connected to a distributary pipeline for enabling the irrigation water to flow to predetermined irrigation areas. In other embodiments, the output end 50 can be connected to a spray head to spray the irrigation water onto the agriculture plants.

The electrolytic gas generator 20 is for generating and outputting a first gas A1 and a second gas A2.

The electrolytic gas generator 20 has a first output line 20a and a second output line 20b for outputting the first gas A1 and the second gas A2 respectively. In the embodiments of the instant disclosure, the first gas A1 is oxygen gas or a mixed gas comprising oxygen gas and ozone, and the second gas A2 is hydrogen gas.

In the embodiments of the instant disclosure, the electrolytic gas generator 20 is indirectly in fluid communication with the reservoir 10. In other words, the first gas A1 and the second gas A2 generated by the electrolytic gas generator 20 will not directly flow into the reservoir 10 but flow into other water-gas mixing tanks before flowing into the reservoir 10.

In the embodiment shown in FIG. 1, the irrigation system 1 further comprises a first water-gas mixing tank 60, a second water-gas mixing tank 70, a first pipeline 61, a first water inlet valve 62, a second pipeline 71 and a second water inlet valve 72. In another embodiment, the electrolytic gas generator 20 is directly in fluid communication with the reservoir 10, and the first gas A1 and the second gas A2 flow into the reservoir 10 for being mixed with irrigation water stored in the reservoir 10. Under this condition, the first water-gas mixing tank 60, the second water-gas mixing tank 70, the first pipeline 61, the first water inlet valve 62, the second pipeline 71 and the second water inlet valve 72 can be omitted.

The first water-gas mixing tank 60 and the second water-gas mixing tank 70 are in fluid communication with the electrolytic gas generator 20 through the first output line 20a and the second output line 20b respectively. In other words, the first gas A1 and the second gas A2 generated by the electrolytic gas generator 20 are output to the first water-gas mixing tank 60 and the second water-gas mixing tank 70 respectively.

In addition, the first water-gas mixing tank 60 and the second water-gas mixing tank 70 store first reserve water and second reserve water respectively. In an embodiment, the first water-gas mixing tank 60 and the second water-gas mixing tank 70 each has a water inlet end (not numbered) to receive the water from an external water supply into the first water-gas mixing tank 60 and the second water-gas mixing tank 70 as the first reserve water and the second reserve water. In addition, the first water-gas mixing tank 60 and the second water-gas mixing tank 70 each has a water outlet end (not numbered). When the water in the first water-gas mixing tank 60 and the second water-gas mixing tank 70 comprises excess water, stored water can be output from the water outlet end.

The first gas A1 flowing into the first water-gas mixing tank 60 can be mixed with the first reserve water and dissolved in the first reserve water. Similarly, the second gas A2 flowing into the second water-gas mixing tank 70 can be mixed with the second reserve water and dissolved in the second reserve water.

Please refer to FIG. 1. The first water-gas mixing tank 60 and the second water-gas mixing tank 70 are in fluid communication with the reservoir 10 through the first pipeline 61 and the second pipeline 71 for allowing the first reserve water and the second reserve water to flow into the reservoir 10 forming the irrigation water.

In addition, the first water inlet valve 62 is arranged on the first pipeline 61 for controlling the flow of the first reserve water, thereby controlling the concentration of dissolved first gas in the irrigation water. Similarly, the second water inlet valve 72 is arranged on the second pipeline 71 for controlling the flow of the second reserve water, thereby controlling the concentration of the second gas A2 in the irrigation water.

In the present embodiment, the electrolytic gas generator 20 electrolyzes water to generate the first gas A1 and the second gas A2. Therefore, the irrigation system 1 further comprises a pure water supplying device 80 communicated to the electrolytic gas generator 20 for supplying water to the electrolytic gas generator 20.

As shown in FIG. 1, in the present embodiment, the pure water supplying device 80 comprises a water supply unit 81 and an ion exchange resin 82, wherein water supplied by the water supply unit 81 passes through the ion exchange resin 82 for removing the anions and cations dissolved therein, and is then provided to the electrolytic gas generator 20. In an embodiment, the water supply unit 81 is a tank or a water input pipeline.

Figure 2:
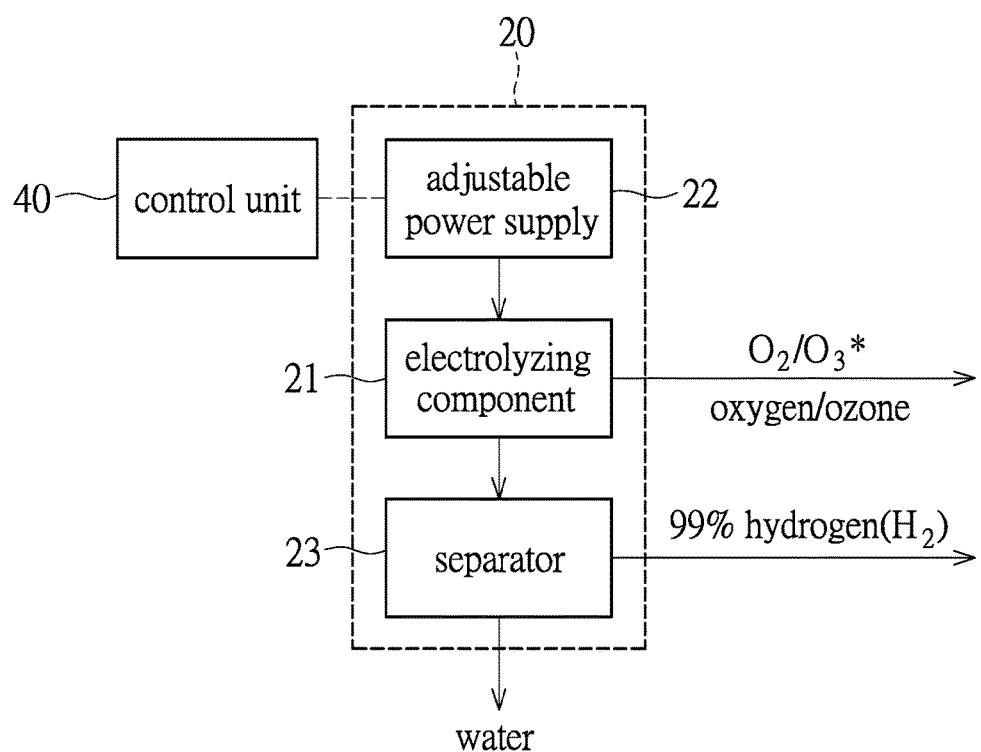
FIG. 2 shows a function block diagram of the electrolytic gas generator of the embodiments of the instant disclosure.

The electrolytic gas generator 20 of the present embodiment is a proton exchange membrane (PEM) electrolytic gas generator. Please refer to FIG. 2 and FIG. 3. FIG. 2 shows a function block diagram of the electrolytic gas generator of the embodiments of the instant disclosure, and FIG. 3 shows a schematic view of the water electrolyzing component of the embodiments of the instant disclosure.

The electrolytic gas generator 20 of the embodiments of the instant disclosure comprises a water electrolyzing component 21, an adjustable power supply 22 and a separator 23.

Figure 3:
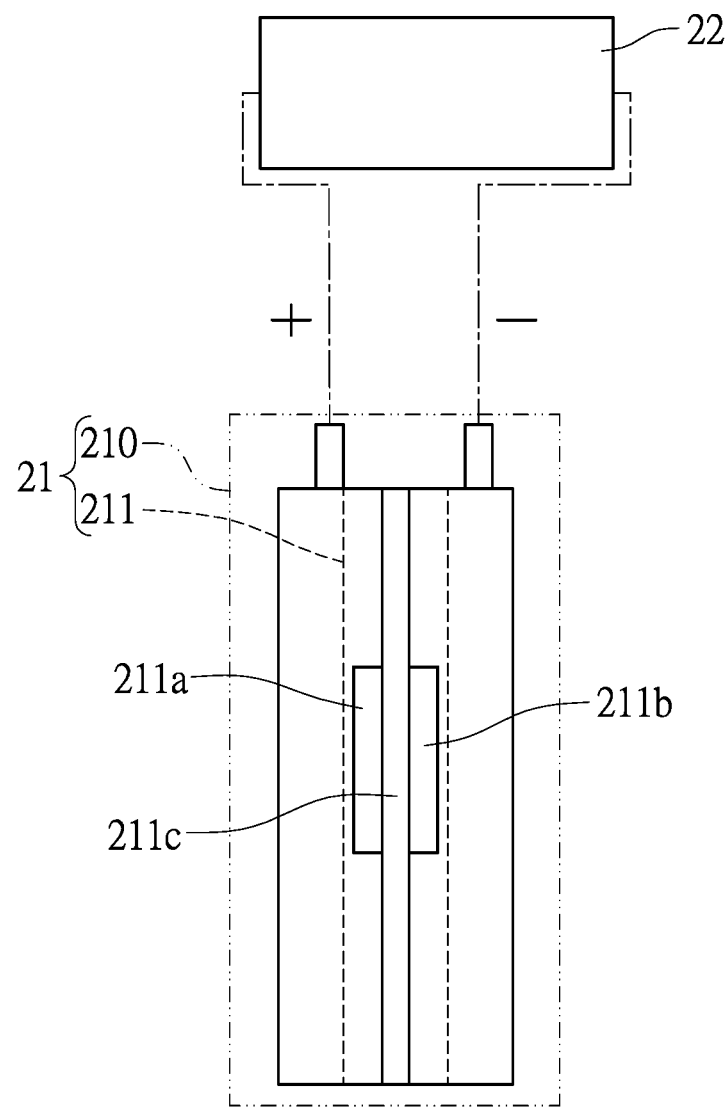
FIG. 3 shows a schematic view of the water electrolyzing component of the embodiments of the instant disclosure.

Please refer to FIG. 3. The water electrolyzing component 21 comprises an electrolyzer 210 and a membrane electrode set 211 disposed in the electrolyzer 210, in which the electrolyzer 210 is communicated with the pure water supplying device 80. The membrane electrode set 211 comprises an anode 211a, a cathode 211b and a proton exchange membrane 211c disposed between the anode 211a and the cathode 211b. In the present embodiment, the cathode 211b is platinum (Pt)/carbon black optionally coated on carbon cloth. The material of the anode 211a and the gases generated by the anode 211a are discussed later.

Please refer to FIG. 2. The adjustable power supply 22 is electrically connected to the water electrolyzing component 21, i.e., electrically connected to the anode 211a and the cathode 211b for forming an electric circuit. When the electrolysis process is performed, the adjustable power supply 22 provides a voltage value to the membrane electrode set 211 for electrolyzing water in the electrolyzer 210, thereby generating a first gas A1 and a second gas A2 at the anode 211a and the cathode 211b respectively. The second gas A2 is hydrogen gas. After the electrolysis process, the second gas A2 generated at the cathode 211b (hydrogen gas) is mixed with water. The separator 23 is used to separate the second gas A2 from water, and the hydrogen gas is then output by the second output line 20b.

The material of the anode 211a comprises an additive and a composition, in which the composition comprises perfluorinated sulfonic acid resin (Nafion), polytetrafluoroethylene (PTFE), sulfuric acid ($H_2SO_4$), carbon nanotubes and graphene. The perfluorinated sulfonic acid resin can be used as an adhesive and the polytetrafluoroethylene can be used for reinforcing the catalytic layer structure. In addition, the sulfuric acid can increase the porosity in the catalytic layer for enabling the water molecules to enter. The carbon nanotubes and the graphene increase the conductivity of the catalytic layer.

The additive can be selected form the group consisting of iridium, iridium black, iridium oxide, ruthenium, ruthenium oxide, platinum, platinum iridium, palladium, iridium ruthenium oxide, iridium-ruthenium-tantalum oxide, nickel-tin-antimony alloy, lead dioxide, glassy carbon, boron doped diamond, platinum tantalum oxide and any combination thereof.

The additive of the anode 211a and the voltage value applied to the membrane electrode set 211 are selected based on the type of the first gas to be generated. For example, when the first gas generated at the anode 211a is oxygen gas, the voltage value is less than 1.5V and the additive of the anode 211a is a catalyst that assists in the generation of hydrogen gas and oxygen gas, such as iridium, iridium black, iridium oxide, ruthenium, ruthenium oxide, platinum, platinum iridium, palladium, iridium ruthenium oxide, iridium-ruthenium-tantalum oxide, and any combination thereof.

In another embodiment, when the gases generated at the anode 211a comprise oxygen gas and ozone, the voltage value must be larger than 1.5V, and the additive of the anode 211a is a catalyst that assists the generation of ozone such as tin-antimony-nickel alloy, lead dioxide, glassy carbon, boron doped diamond, platinum tantalum oxide and any combination thereof.

As mentioned before, the first gas A1 generated by the electrolytic gas generator 20 at the anode 211a is passed into the first water-gas mixing tank 60 through the first output line 20a, thereby allowing the first reserve water to become oxygen-rich water or oxygen/ozone-rich water. In addition, the second gas A2 generated by the electrolytic gas generator 20 at the cathode 211b is passed into the second water-gas mixing tank 70 through the second output line 20b, thereby allowing the second reserve water to become hydrogen-rich water.

The oxygen/ozone-rich water and the hydrogen-rich water flow into the reservoir 10 through the first pipeline 61 and the second pipeline 62 respectively and form the irrigation water. When the irrigation water has an ozone concentration of from 0.3 ppm to 3 ppm, the growth rate of the plants is effectively increased, and the irrigation water also has no detrimental effect toward the plant. In addition, using the irrigation water comprising ozone to spray the agricultural products inhibits the growth of germs and reduces the occurrence of diseases of the plants. In an experimental example, common water, ozone water of 0.5 ppm and ozone water of 3 ppm are used to irrigate tomato. The applicant discovered that along with the increase of the ozone concentration, the weight and the area of the leaf of the tomato increase. Therefore, using ozone water of 3 ppm to irrigate tomato can obtain a preferable result.

In addition, by using irrigation water containing hydrogen gas to spray fruits that are harvested, the maturation and aging of the fruits can be delayed. For example, impregnating harvested kiwi in hydrogen-rich water can delay the aging of the fruit without the use of chemicals, thereby extending the shelf life. Therefore, irrigation water provided by the irrigation system of the embodiments of the instant disclosure can not only be used to reduce the diseases of the plants, but to extend the shelf life of the plants.

Please refer to FIG. 1. The detector 30 is disposed in the reservoir 10 for detecting irrigation water for obtaining concentration detecting information. The concentration detecting information comprises a concentration of dissolved first gas and a concentration of dissolved second gas. In another embodiment of the instant disclosure, the irrigation system 1 comprises a first detector 301 and a second detector 302 disposed in the first water-gas mixing tank 60 and the second water-gas mixing tank 70 respectively for detecting the concentration of dissolved first gas of the first reserve water and the concentration of dissolved second gas of the second reserve water respectively. However, in other embodiments, the first detector 301 and the second detector 302 can be omitted.

The control unit 40 is electrically connected to the electrolytic gas generator 20, the detector 30, the first detector 301, the second detector 302, the first water inlet valve 62, the second water inlet valve 72 and the output control valve 50a.

In the embodiments of the instant disclosure, the control unit 40 is electrically connected to the adjustable power supply 22. The control unit 40 can receive the concentration detecting information provided by the first detector 301 and the second detector 302, and control the on/off of the adjustable power supply 22 based on the concentration detecting information to control whether or not the electrolytic gas generator 20 output the first gas A1 and the second gas A2.

For example, when the control unit 40 receives the concentration detecting information from the detector 30 and judges that the hydrogen concentration and the oxygen concentration in the irrigation water are insufficient, the control unit 40 activates the adjustable power supply 22 to provide a voltage value to the membrane electrode set 211 for electrolyzing water in the electrolyzer 210 and generating hydrogen gas and oxygen gas.

In an embodiment, the control unit 40 adjusts the voltage value of the adjustable power supply 22 based on the concentration detecting information to control the type of the first gas A1. Specifically, the ratio between oxygen gas and ozone in the first gas A1 can be controlled based on the voltage value of the electrolytic gas generator 20 and the selection of the anode 211a. In addition, the concentration ratio between oxygen gas and ozone is related to the voltage value, i.e., the concentration ratio of the ozone increases while increasing the voltage value. Therefore, the ratio between oxygen gas and ozone can be adjusted by controlling the voltage value to be larger than 1.5 V by the control unit 40.

For example, when the control unit 40 receives the concentration detecting information from the first detector 301 and judges that the concentration of ozone in the first reserve water is insufficient, the control unit 40 adjusts the voltage value of the adjustable power supply 22 to be larger than 1.5 V for generating oxygen gas and ozone which flow into the first water-gas mixing tank 60 and increases the concentration of ozone in the first reserve water.

In addition, the control unit 40 can control the flow of the first reserve water and the second reserve water into the reservoir 10 by controlling the first water inlet valve 62 and the second water inlet valve 72 according to the concentration detecting information provided by the detector 30, thereby controlling the ratio of the concentration of dissolved first gas and the concentration of dissolved second gas in the irrigation water.

The control unit 40 is electrically connected to the output control valve 50a for controlling the flow of irrigation water passing the output end 50. In an embodiment, the control unit 40 can control irrigation water to flow at a certain time. In sum, the irrigation system provided by the embodiments of the instant disclosure uses the electrolytic gas generator to generate oxygen gas, ozone and hydrogen gas, and these gases are dissolved in water to irrigate plants. Therefore, the growth rate and the shelf life of the agricultural products are increased while reducing the use of pesticides and chemicals. By reducing the use of pesticides and chemicals, the environment pollution caused therefrom can be avoided and the pesticides and chemicals that are harmful to the human body are not likely to remain on the agricultural products The above-mentioned descriptions represent merely the exemplary embodiment of the present disclosure, without any intention to limit the scope of the instant disclosure thereto. Various equivalent changes, alterations or modifications based on the claims of the instant disclosure are all consequently viewed as being embraced by the scope of the instant disclosure.

What is claimed is:

1. An irrigation system, comprising:
a reservoir for storing irrigation water;
an electrolytic gas generator for outputting a first gas and a second gas, wherein the electrolytic gas generator is in fluid communication with the reservoir for mixing the first gas and the second gas into the irrigation water;
a detector arranged in the reservoir, the detector detects the irrigation water for obtaining a concentration detection information, wherein the concentration detection information comprises a concentration of dissolved first gas and a concentration of dissolved second gas; and
a control unit electrically connected to the electrolytic gas generator and the detector, wherein the control unit adjusts a voltage value of the electrolytic gas generator according to the concentration detection information, and the control unit controls the type of the gases generated by the electrolytic gas generator and adjusts the concentration of dissolved first gas and the concentration of dissolved second gas in the irrigation water by adjusting the voltage value.

2. The irrigation system according to claim 1, further comprising a first water-gas mixing tank for storing a first reserve water, the first water-gas mixing tank is in fluid communication with the reservoir and the electrolytic gas generator for providing the first reserve water to the reservoir, wherein the electrolytic gas generator has a first output line, and the first gas is output to the first water-gas mixing tank through the first output line.

3. The irrigation system according to claim 2, further comprising a first pipeline communicated between the first water-gas mixing tank and the reservoir and a first water inlet valve arranged on the first pipeline, wherein the control unit is electrically connected to the first water inlet valve for controlling the amount of the first reserve water passing the first pipeline.

4. The irrigation system according to claim 1, further comprising a second water-gas mixing tank for storing a second reserve water, the second water-gas mixing tank is in fluid communication with the reservoir and the electrolytic gas generator for providing the second reserve water to the reservoir, wherein the electrolytic gas generator has a second output line, and the second gas is output into the second water-gas mixing tank through the second output line.

5. The irrigation system according to claim 4, further comprising a second pipeline communicated between the second water-gas mixing tank and a second water inlet valve arranged on the second pipeline, wherein the control unit is electrically connected to the second water inlet valve for controlling the amount of the second reserve water passing through the second pipeline.

6. The irrigation system according to claim 1, further comprises an output end communicated to the reservoir and a water output control valve arranged between the output end and the reservoir, wherein the water output control valve controls the amount of the irrigation water passing the output end.

7. The irrigation system according to claim 1, wherein when the voltage value is less than 1.5V, the first gas is oxygen gas and the second gas is hydrogen gas.

8. The irrigation system according to claim 1, wherein when the voltage value is larger than 1.5V, the first gas comprises oxygen gas and ozone, and the second gas is hydrogen gas.

9. The irrigation system according to claim 1, further comprising a pure water supplying device connected to the electrolytic gas generator for supplying water to the electrolytic gas generator.

10. The irrigation system according to claim 1, wherein the electrolytic gas generator is a proton exchange electrolytic gas generator comprising:
a water electrolyzing component comprising an electrolyzer and a membrane electrode set arranged in the electrolyzer, wherein the electrolyzer is in fluid communication with the pure water supplying device, the membrane electrode set comprises an anode, a cathode and a proton exchange membrane located between the anode and the cathode; and
an adjustable power supply electrically connected to the anode and the cathode for forming an electric circuit, wherein the control unit is electrically connected to the adjustable power supply for adjusting the voltage value of the adjustable power supply.

11. The irrigation system according to claim 10, wherein the anode comprises an additive and a composition, the additive is selected from a group consisted of iridium, iridium oxide, ruthenium, ruthenium oxide, platinum, platinum-iridium, palladium, iridium-ruthenium oxide, iridium-ruthenium-tantalum oxide, tin-antimony-nickel alloy, lead dioxide, glassy carbon, boron doped diamond, platinum-tantalum oxide and the combination thereof, and the composition comprises perfluorinated sulfonic acid resin, polytetrafluoroethylene, sulfuric acid , carbon nanotubes and graphene.

12. The irrigation system according to claim 10, wherein the anode comprises an additive and a composition, wherein when the first gas comprises oxygen gas and ozone, the additive is tin-antimony-nickel alloy, lead dioxide, glassy carbon, boron doped diamond, platinum-tantalum oxide or the combination thereof, and the composition comprises perfluorinated sulfonic acid resin, polytetrafluoroethylene, sulfuric acid, carbon nanotubes and graphene, and the voltage value is larger than 1.5V.

* * * * *